United States Patent
Bauer et al.

[15] 3,676,776
[45] July 11, 1972

[54] TESTING PROBE CONSTRUCTION

[72] Inventors: Franz Bauer, Pullach; Karl Friedrich Besemer, Planegg; Gotthard Kinner, Munich, all of Germany

[73] Assignee: Siemens Aktiengesellschaft, Berlin and Munich, Germany

[22] Filed: Jan. 19, 1970

[21] Appl. No.: 3,726

[52] U.S. Cl. .....................324/72.5, 324/158 P, 339/108 TP
[51] Int. Cl. .........................................................G01r 31/02
[58] Field of Search ...............324/158 P, 158 F, 72.5, 12.64; 339/108 TP, 45; 200/46, 166 BA, 166 BE, 166 BB, 166 PC

[56] References Cited

UNITED STATES PATENTS

| | | | |
|---|---|---|---|
| 3,274,534 | 9/1966 | Shortridge | 324/158 P |
| 3,512,084 | 5/1970 | Roberts | 324/72.5 |

OTHER PUBLICATIONS

J. F. McDonald Logic Function Indicator Probe IBM Technical Disclosure Bulletin 8(4) 9/65 pp. 661, 662
J. F. Hallenback Electrical Contacting Probe IBM Technical Disclosure Bulletin 9(5) 1966 p. 453

*Primary Examiner*—Michael J. Lynch
*Attorney*—Hill, Sherman, Meroni, Gross & Simpson

[57] ABSTRACT

Precise testing of printed circuit boards having closely spaced contact bores is made possible by an apparatus comprising a plurality of predisposed, closely spaced contact needle probes each of which has a flexible, slender construction to automatically compensate for spacing variations of the contacts within manufacturing tolerances and each of which may have a detachable contact head to compensate for variations in contact bore diameters. A generally spherical contact probe head surface assures a uniform contact with the edge of the bore and hence equal contact resistances, regardless of the angle of the probe with the bore.

10 Claims, 7 Drawing Figures

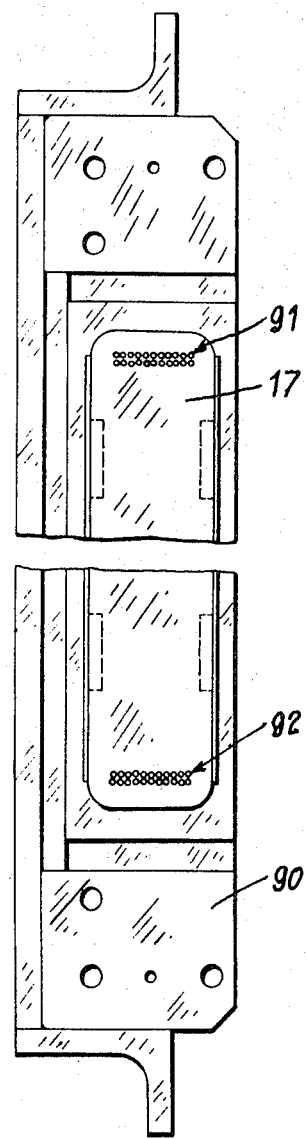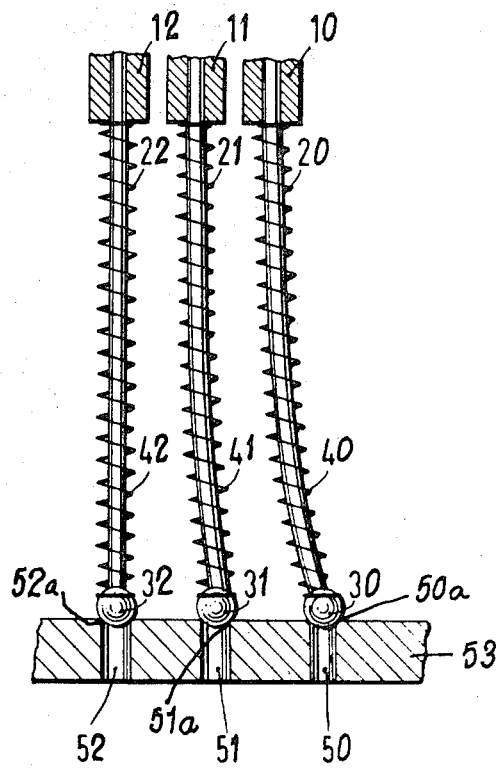

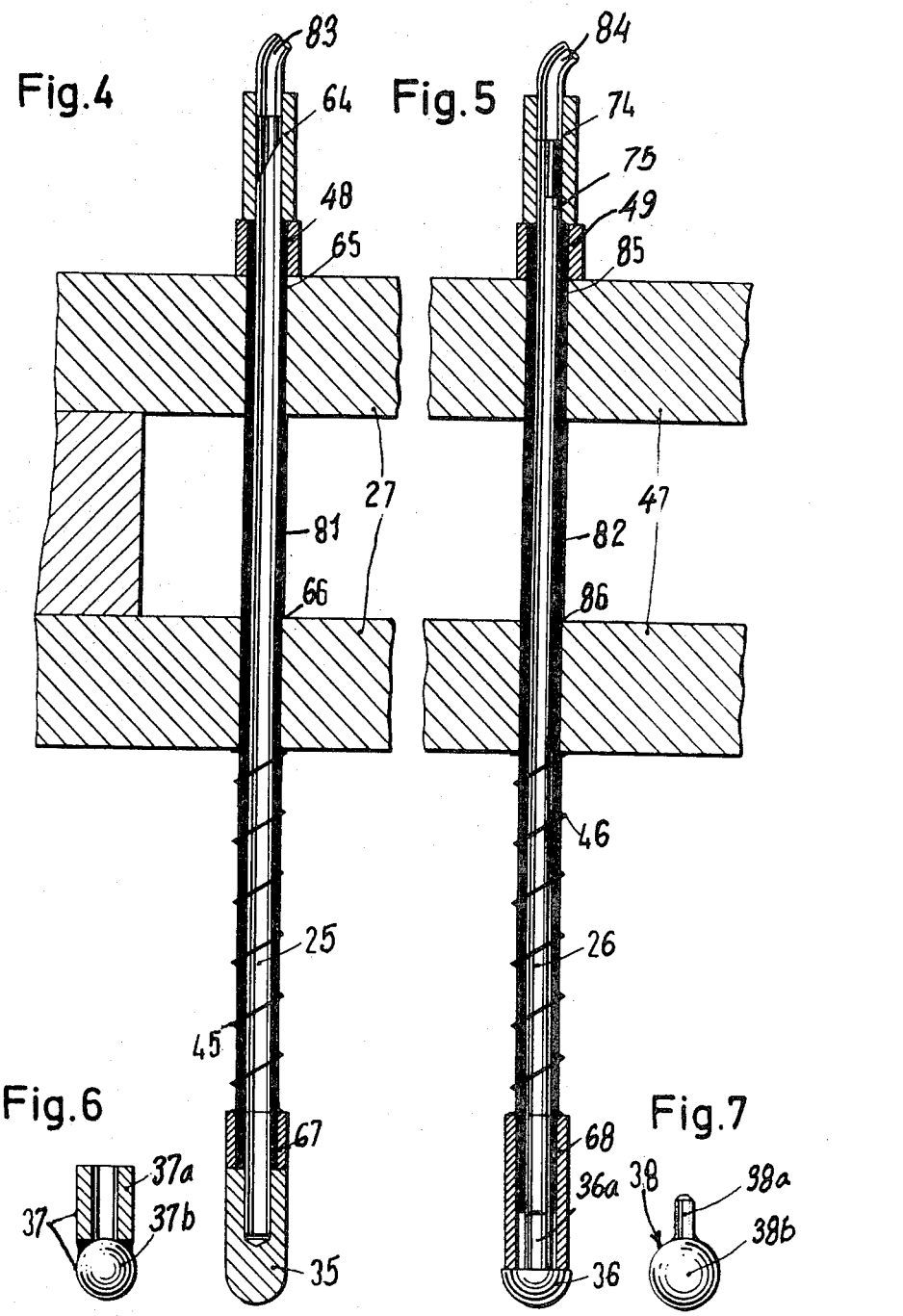

TESTING PROBE CONSTRUCTION

BACKGROUND OF THE INVENTION

1. Field of the Invention

This invention generally relates to an automatic electrical contact testing apparatus for the simultaneous electrical connection of a large number of contacts spaced a small distance from one another. More particularly, the invention contemplates an apparatus for the testing of metallized bore-type contacts of a printed circuit card or circuit plaque wherein the contacts to be tested are closely spaced and the electrical test equipment has a number of contact needle probes corresponding exactly in number and generally in position to the contacts which are tested by simultaneous pressing of all of the testing probes on all of the contacts to be tested.

2. Prior Art

For the electrical testing of printed circuit cards by means of automatic testing devices, a large number of the contacts disposed on the circuit card must be connected simultaneously with the automatic testing devices. In these cases the uniformity of the contact resistances must be precise because a comparatively high specific current load must be accommodated in the case of many of the various testing procedures. Also, the bearing forces of the contacts may not exceed or be less than predetermined tolerances.

In the German Gebrauchsmuster Patent 1,950,659, there is disclosed a testing apparatus for printed circuit cards wherein the connection with the contacts of the circuit card are established by means of brass plates which are provided with inserted pointed contact needles. This prior art contact testing device, however, does not permit the achievement of sufficiently uniform contact resistances. One reason for this non-uniformity resides in the fact that the metallized bore-type contacts of the circuit card may not always be disposed at the most accurate grid distances due for example, to variations within manufacturing tolerances. Where these variations occur, the pointed testing contact needles which must be accurately seated in the bores are pushed or moved out of their original positions when they assume the testing position so that the various pointed contact needles are deflected to various directions and by various amounts. Because these prior art needles sit differently on the contacts of the circuit card being tested a different contact resistance results.

SUMMARY OF THE INVENTION

The above noted problems and disadvantages of the prior art are overcome by the present invention disclosed herein which provides a contact testing apparatus wherein despite the variations within the manufacturing tolerances in the contact grid field of the circuit board, the bearing surfaces between the test probes and the individual bore-type contacts are substantially the same and substantially the same low contact resistances are found on all contacts.

This result is accomplished in the instant invention by providing a contact testing apparatus wherein the ends of the contact needle probes being pressed on the circuit board contacts are shaped in the form of a sphere and the probes are fabricated from a slender, elastic material.

The spherical contact assures that regardless of the angle of deflection of the probe, as for example, in the case of the customary circuit board contacts consisting of metallized bores, there will be assured a constant and complete annular bearing surface between the probe sphere and the bore periphery and hence the equal contact pressure with a corresponding constant contact resistance. Moreover, because of the use of an elastic flexible material, the contact needle probes may move laterally to compensate for and accommodate variations in the spacing of the contact grid field.

Vertical movement is also facilitated. Thus, the individual contact needle probes are guided easily and slidably into electrically insulated bearing bushings so that no variation or falsification of the contact force occurs as a result of wall friction losses. Polytetrafluorethylene is an example of a material that has been successfully employed in the manufacture of these bearing bushings. Advantageously the bearing bushings are constructed in the form of a collar to obtain long leaking paths between the closely spaced individual probes.

According to an advantageous further development of our invention the contact probes are covered with an insulated sleeving whereby the contact probes coated with the insulated sleevings may slide directly into bores of a probe carrier. Thus, the distances between the individual probes and the size of the bore in the needle probe carrier may be reduced so that maximum variations and sizes of the circuit boards may be tested by the apparatus. In addition, the mounting, changing and replacement of the probes is facilitated in that the probes and their connecting wires may be connected with one another prior to assemblage in the probe carriers. This preconnection rules out any bending of the probes or the danger of damaging already existing connections.

It is also within the contemplation of this invention to eliminate the influence of atmospheric humidity on the contact resistances by heating the contact probes by means of resistance heaters built into the probe carriers.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 2 is a view looking up at the underside of a probe carrier and a carrier supporting means;

FIG. 3 is an enlarged blow up of three probes made according to the present invention illustrating their flexibility and engagement with the three bore type contacts being tested;

FIG. 4 is an elevational side view in cross-section of a probe carrier and a probe according to a second embodiment of the invention;

FIG. 5 is an elevational side view in cross-section of a probe carrier and a probe according to a third embodiment of the invention;

FIGS. 6 and 7 are elevational cross-sectional views of yet further embodiments of the probe contact head construction.

DESCRIPTION OF THE PREFERRED EMBODIMENTS

Figure 1:
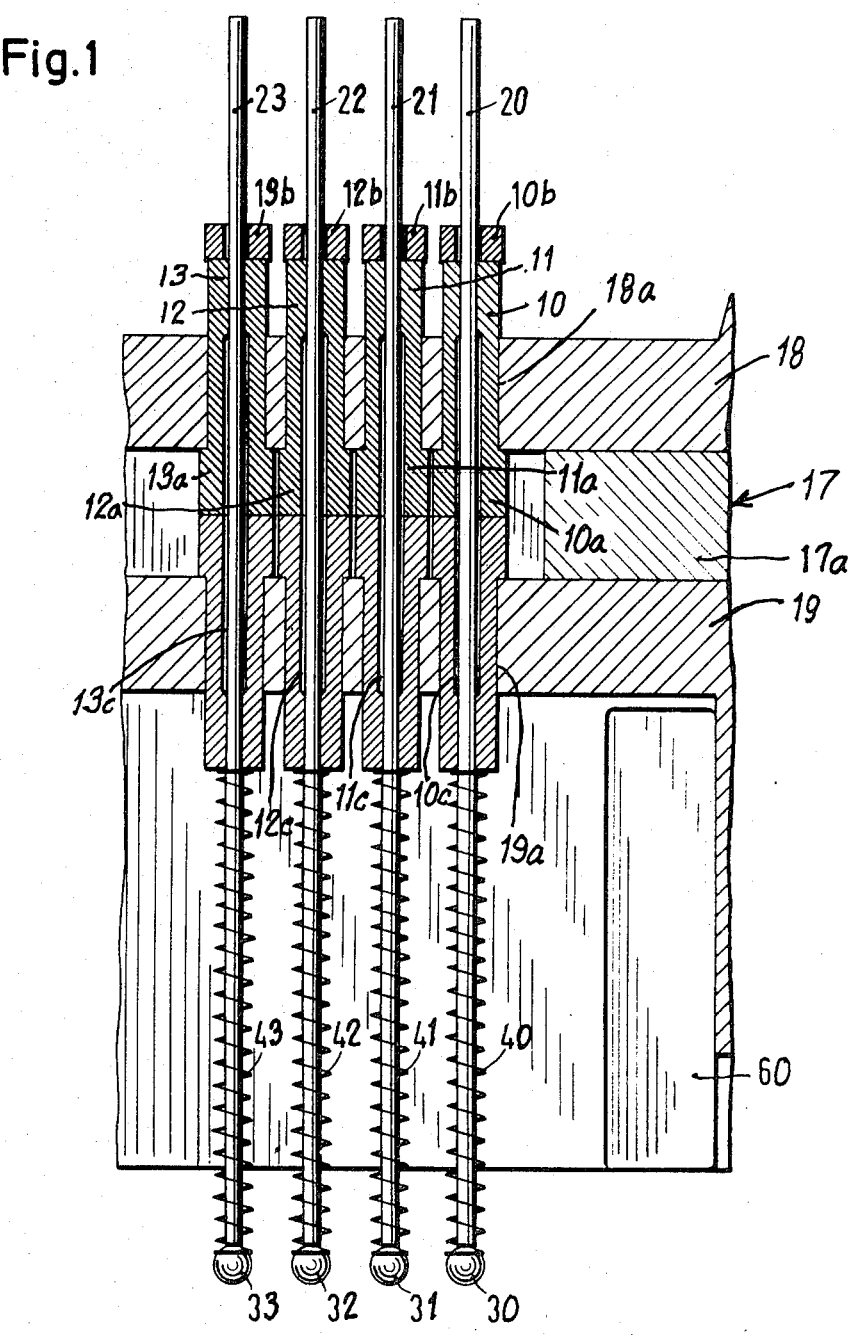
FIG. 1 is an elevational view partly in cross-section of a probe carrier and four probes according to a first embodiment of the invention.

Referring to FIG. 1 there is shown an embodiment of the invention wherein a probe carrier generally indicated at 17 includes a pair of spaced plates 18, 19 each having coaxial holes 18a, 19a therethrough. As shown for purposes of illustration, four bushings, generally indicated at 10, 11, 12 and 13 extend respectively through the holes 18a, 19a. Each bushing has an enlarged central portion 10a, 11a, 12a, and 13a respectively which, together with the member 17a acts as a spacer for the carrier members 18 and 19. Advantageously each of the bushings 10, 11, 12, and 13 may be made of a polytetrafluoroethylene so that probes generally indicated at 20, 21, 22 and 23 may be guided easily and slidably therein. The bushings 10, 11, 12 and 13 include collar-shaped portions 10b, 11b, 12b and 13b respectively to produce long leaking paths between the individual probes.

The probes 20, 21, 22 and 23 according to the present invention are made of an elastic material such as spring steel for example, to enable the probes to flex laterally and thereby accommodate any variations in the spacings of the bore type contacts of the grid field. At the end of each of the probes 20 through 23 there are disposed contact spheres 30, 31, 32 and 33 respectively which serve to engage the contacts to be tested. Of course, the probes and their respective spheres are of an electric conducting material and are conveniently attached adjacent their upper ends to wires not shown. Vertical movement of the probes is facilitated by the relatively frictionless bushing material and by the provision of coiled springs 40, 41, 42 and 43 respectively which, as shown, may surround their respective probes and bear between an enlarged contact sphere and the lower surface of each probe bushing. The frictionless movement of the probes 20 through 23 is increased by the provision of an enlarged portion 10c, 11c, 12c and 13c respectively so that the probes are in contact with the bushings only at the opposite ends of the respective bushings.

One or more resistance heaters schematically illustrated at 60 may be disposed in the probe carrier to heat the probes and thereby eliminate the influence of atmospheric humidity on the contact resistances.

The relationship of the carrier 17 to a carrier support member 90 is shown in FIG. 2 in a view looking up at the underside of the probe carrier. Groups of probes generally indicated at 91 and 92 are schematically illustrated to show their relationship to the probe carrier. From this vantage point only the probe contact heads would be visible. It will be understood that the number, size and arrangement of the probes will depend upon the particular circuit board being tested. From FIG. 2 it may be seen that the spacing of the probes and their accompanying contact heads may be very close thereby emphasizing the importance of the slenderness of the probes and the advantages of their flexibility.

The flexibility of the probes is further illustrated in FIG. 3 wherein a portion of the probes 20, 21 and 22 of FIG. 1 are shown as they might appear in contact with bore-type contacts 50, 51 and 52 respectively on a circuit board 53. The distances between the contacts of a printed circuit board are exaggerated to illustrate the ability of the probes of the present invention to accommodate variations in the spacing distances from predetermined rated values as a result of manufacturing conditions. The ability of the spherical contact heads 30, 31 and 32 to be fully seated about the periphery of the openings 50a, 51a and 52a of the bore contacts 50, 51 and 52 respectively, regardless of the inclination of the probes 20, 21 and 22, may be clearly seen. As before, the biasing means 40, 41 and 42 act on the sphere to produce equal contact pressure with its corresponding constant contact resistance. The probes 20, 21 and 22, being slidably held in the guide bushings 10, 11 and 12, are in a position to adjust to the distances of the contacts 50, 51 and 52 because of their elastic properties. The spherical shape of the probe contact heads 30, 31 and 32 allows them to lie in the metallized bore contacts thereby assuring constant and complete annular bearing surface between the probe sphere and the bore.

In the embodiment of FIG. 4 there is shown an individual probe covered with a layer 81 of high quality insulating material which may advantageously be polytetrafluorethylene which has excellent sliding characteristics. In practice we have found it advantageous to provide the insulating material in the form of a tube that is slipped over the probe. Because of the excellent relatively frictionless characteristics of the polytetrafluorethylene the bearing bushing such as shown at 10 for example in FIG. 1 may be dispensed with. Again, however, to obtain sufficiently large leaking paths a spacer 48 made of a similar high quality insulating material is mounted between a soldering sleeve 64 and a probe carrier generally indicated at 27. For the same reason, a spacer 67 is mounted between a contact head 35 and the coil spring 45. The connection of the probe 25 with a wire means 83 is shown. A soldering collar 64 attached to the upper end of the probe 25 provides a limit to the downward movement of the probe. As set forth above the vertical movement of the probe 25 through the close fitting holes 65, 66 in the carrier 27 is made possible by the sliding qualities of the probe coating 81. As before, the probe 25 is also of slender construction and flexible laterally.

Since the printed circuit boards to be tested and for which the probes must be arranged, may not all have the same contact bore diameters, and since the ratio of the contact head diameter to the contact bore diameter is predetermined, the probes such as 25 in FIG. 4 must be provided with various sized contact heads depending upon the particular size and arrangement of the printed circuit board being tested. To allow the rapid change of the probe contact heads, a detachable one piece contact head 35 has been found advantageous. The head 35 may be detachably connected to the probe 25 in any convenient manner. The semi-spherical head has been found very adequate.

In another embodiment the contact head may be of two parts as shown at 37 in FIG. 6. Thus, the head 37 may be seen to comprise a tubular length 37a having a sphere 37b welded thereon. In the two-piece type contact head the diameter of the head 37b may be varied at will with economically justifiable means even when very small tests quantities are involved. There may be also used, as shown in FIG. 5, a thin-wall elastic metal tube 75 for the probe 26 which is likewise coated with a layer of high grade insulating material 82.

When the metal tube 75 is used as shown in FIG. 5, the provision of a soldered joint 76 between a lead 77 of a wire 84 and the probe 26 is expedited since the copper conductor lead 77 may be directly inserted into the bore of the tube 75 and thus consistently and perfectly fixed each time. The soldered joint 76 itself may likewise be effected by means of a soldering sleeve not shown but as will be understood by those skilled in the art.

In the embodiment set forth in FIG. 5 the preconnected probe 26 without its contact head 36 or its insulating collar 68 is inserted directly into coaxial bores 85, 86 in the probe carrier member 47. Slidability of the probe 26 in the openings 85, 86 is facilitated by the slipperiness of the coating 82 on the probe 26. With the probe thus in place a resilient means such as a coil spring 46 may be slipped over the outside of the probe and held in position abutting the probe carrier 47 by a collar 68. The collar 68 in turn may be held in place by the contact head 36. Various contact head constructions may be utilized such as the contact rivet head shown at 36 in FIG. 5. In this case a pin portion 36a of the contact rivet 36 has an inside dimension corresponding to the inside dimensions of the tube 75. Attachment of the contact head 36 to the probe 26 may be by any conventional means.

A further species of the contact head useful in the present invention is shown in FIG. 7 in which case the "rivet" contact head 38 consists of a pin 38a with a ball or sphere 38b welded thereon. As set forth with respect to the contact head 36 the contact head 38 may be attached to the probe 26 by inserting the pin portion 38a in the tube 75. The ready detachability of the various contact heads 30, 31, 32, 33, 35, 36, 37 and 38 permits their ready interchange so that spheres of various diameters may be used in accordance with the requirements of various circuit board contact sizes and arrangements.

The embodiment of the invention as shown in FIGS. 5 and 6, wherein the insulation of the contact probes 25 and 26 is effected by means of insulated sleeve members 81, 82 respectively, facilitates the mounting of the probes in the probe carriers 27, 47 in compact, closely spaced relationship thereby allowing easy accommodation of the wiring panels as is more clearly illustrated in FIG. 2 for example.

Operation of the testing apparatus may be understood in connection with FIGS. 2 and 3. Thus, with the probes such as herein illustrated at 20, 21, 22, 23, 25 and 26 disposed in a group size shown at 91 and 92, which groups correspond in number and arrangement to the contacts on a particular batch of circuit boards to be tested, a circuit board as illustrated at 53 having bore-type contacts 50, 51, and 52, is moved into place below the probes. With the probes arranged to correspond to the predetermined layout of the circuit board contacts most probes will assume the position as shown by the probe 22 in FIG. 3 whereby the spherical contact head 32 will be in contact with the upper peripheral edge 52a of the circular bore 52. The resilient member 42 biasing the probe 22 downwardly will assure uniform contact pressure and hence uniform, low contact resistances which will provide accurate testing. If, because of variations within the manufacturing tolerances a circuit board contact such as shown at 50 or 51 should be in a position different from the optimum position at which the probes were arranged, the spherical contact heads 30,31 will find their way into the "irregularly spaced" bore-type contacts because of, for example, the flexibility allowed by the probes 20, 21 because of the low friction point contact between the spherical heads 30,31 and the surface of the circuit board 53, and because of the downward biasing force of the resilient members 40, 41. Moreover, the probes will be perfectly seated in the contacts with a constant and complete annular bearing surface between the contact sphere and the contact bore periphery and hence provide a constant contact resistance which will allow accurate and precise testing regardless of the angle of the probe with the bore.

Although we have herein set forth our invention with respect to certain specific principles and details thereof, it will be understood that these may be varied without departing from the spirit and scope of the invention as set forth in the hereunto appended claims.

What we claim is:

1. An electrical testing apparatus for the simultaneous testing of a plurality of bore-type contacts of a circuit board comprising a carrier means supporting a plurality of elongated, slender probe members, said probe members each having at a first end thereof a generally spherically shaped contact head enlarged with respect to said probe member, said contact head being adapted to be seated in one of said bore-type contacts so that excellent electrical contact is effected therebetween, said contacts on said circuit boards being positioned thereon in a predetermined arrangement and said probes being positioned in said carrier means in a corresponding arrangement so that said spherical contact heads will each seat in a predetermined contact, said probes being flexible and axially slidably movable in said carrier so that minor deviations in arrangement of said contacts may be accommodated by said probes, said individual probes having a resilient coil spring means disposed about said probe member between said probe carrier and said contact head.

2. A probe construction according to claim 1 wherein said probe members are slidably guided through electrically insulated bearing bushings in said carrier, said bushings being of a polytetrafluorethylene material.

3. A probe construction according to claim 1 wherein said probe members include insulated sleeves forming the outer surface thereof, said insulated sleeves sliding directly in bores in said carrier means.

4. A probe construction according to claim 1 wherein said contact points are heated by means of resistant heaters disposed adjacent the probe carrier.

5. A probe construction according to claim 3 wherein said coil spring is disposed about said insulated sleeve and in electrical connection with said contact head.

6. A probe construction according to claim 1 wherein said probe members consist of thin metal tubes.

7. A probe construction according to claim 2 wherein said bearing bushings take the form of a collar so that long leaking paths are provided.

8. A probe construction according to claim 1 wherein said contact heads are detachably connected to said probe members.

9. A probe construction according to claim 8 wherein said contact head is a ball having a sleeve affixed thereto, said sleeve having an inner diameter receiving the probe in a detachable frictional engagement.

10. A probe construction according to claim 8 wherein said contact head comprises at least a semi-spherical portion having a pin means affixed thereto, said pin means being adapted to be received within a lower end of said probe member in generally axial alignment therewith.

* * * * *